UNITED STATES PATENT OFFICE.

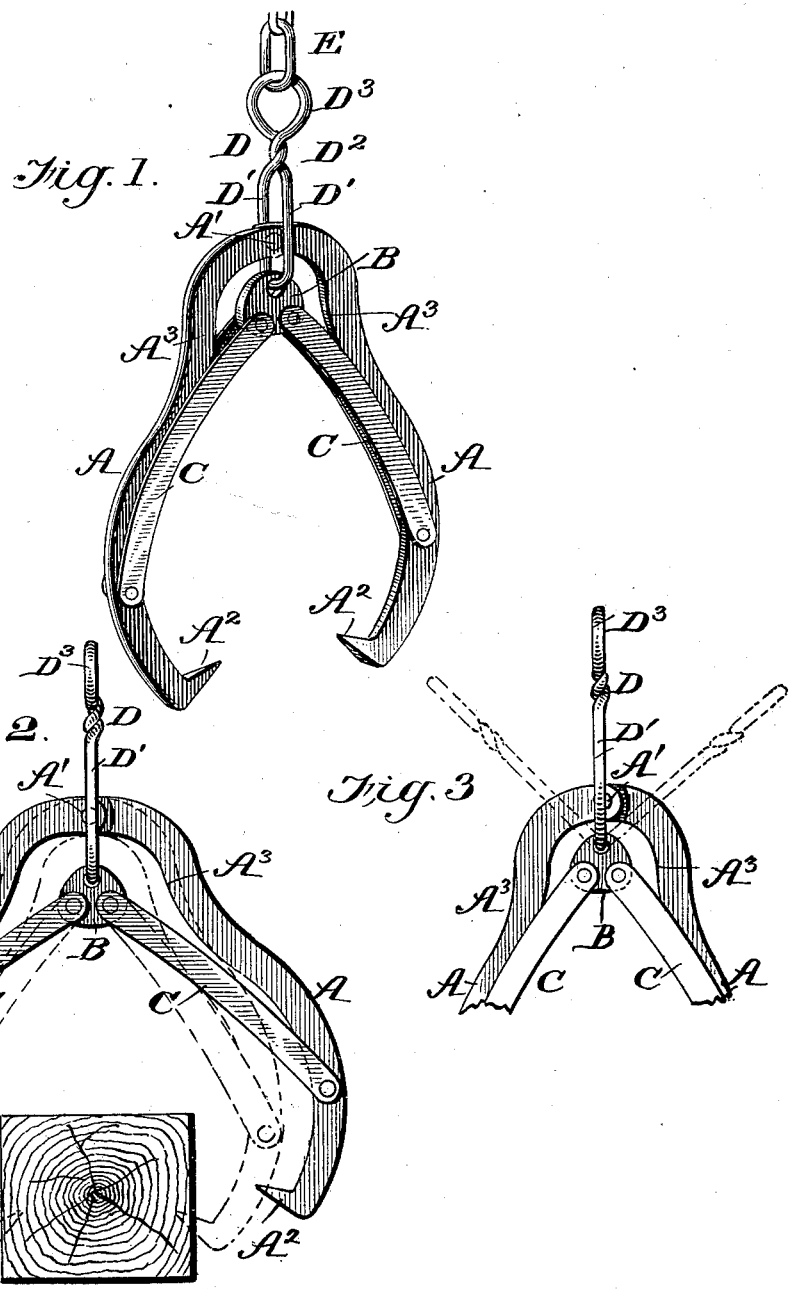

GEORGE H. HITCHINGS AND PATRICK L. LACHAPELLE, OF HOQUIAM, WASHINGTON.

TIMBER-HOOK.

SPECIFICATION forming part of Letters Patent No. 673,263, dated April 30, 1901.

Application filed February 12, 1901. Serial No. 47,006. (No model.)

*To all whom it may concern:*

Be it known that we, GEORGE H. HITCHINGS and PATRICK L. LACHAPELLE, citizens of the United States, residing at Hoquiam, in the county of Chehalis and State of Washington, have made certain new and useful Improvements in Timber-Hooks, of which the following is a specification.

This invention is an improvement in hooks and designed for use in hoisting and dragging timber, piles, hay, ice, logs, or other articles; and it consists in certain novel constructions and combinations of parts, as will be hereinafter described and claimed.

In the drawings, Figure 1 is a perspective view of a hook embodying our invention. Fig. 2 is a side elevation of the hook open in full lines and closed in dotted lines upon a piece of timber; and Fig. 3 is a detail view of the upper portion of the hook, illustrating in dotted lines how the drag device may be adjusted from side to side or swung independently of the hook-bars without releasing its draft upon the bars, all of which will be described.

Our improved hook, as shown, comprises the hook-bars A, which are pivoted together at A' at their upper ends, are provided at their opposite ends with the bars or prongs $A^2$, and are preferably bent at $A^3$ near their upper pivoted ends, curving slightly outward at such point and forming a recess in which operates the joint-plate B, presently described. This joint-plate B is connected by the straps C with the opposite hook-bars, comparatively near the free ends of the latter. To prevent any twisting of the parts, the straps C are preferably arranged in pairs, lapping on opposite sides of the joint-plate and of the bars, as shown. The drag device D is shown in the form of a link connected at its lower end with the joint-plate B in line between the connection of the straps with such joint-plate, and the side bars D' of the drag device extend upward on the opposite sides of the jointed hook-bars and are preferably twisted together at $D^2$ above the said bars and are then provided with a suitable eye $D^3$ to receive the line E. It will be noticed that the drag device when drawn upon exerts a traction upon the joint-plate, which will operate to draw the hook-bars firmly together and force their prongs into the timber or other object to be handled. It will further be noticed that the drag device swings freely from side to side independently of the hook-bars, and being connected directly with the joint-plate operates to exert a traction upon the same and thence upon the connecting-straps in all instances, this traction being exerted whether the drag device is in line with the joint of the hook bars or stands on either side of such joint, as may frequently happen in operating the device and as may be understood from Fig. 3 of the drawings.

It will be noticed that by arranging the connecting-straps in pairs extending side by side and lapping on opposite sides of the joint-plate and of the hook-bars and by also making the drag device with side bars which extend on opposite sides of the hook-bars and of the joint-plate we are able to avoid all twisting at the joints and to maintain and brace the parts of the hook in the desired positions.

Having thus fully described our invention, what we claim as new, and desire to secure by Letters Patent, is—

The herein-described timber-hook or the like consisting of the hook-bars pivoted together at their upper ends, a joint-plate between the hooks near their pivot and lying in the plane of said hooks, the straps arranged on opposite sides of the hook-bars and joint-plate and pivoted at their ends to such parts, and the drag device having a link pivoted to the joint-plate in line between the pivot connections of the opposite pairs of straps with such joint-plate and having its side bars extending on opposite sides of the hook-bars and in close relation thereto whereby the drag device, and the pairs of straps will coöperate with each other and with the joint-plate in bracing the hook-bars all substantially as and for the purposes set forth.

GEORGE H. HITCHINGS.
PATRICK L. LACHAPELLE.

Witnesses as to George H. Hitchings:
J. H. PARKER,
F. L. MORGAN.

Witnesses as to Patrick L. Lachapelle:
VIRGIL PERINGER,
E. L. FRANKLIN.